(No Model.)
F. A. ROBERTS.
DEVICE FOR STRINGING FISH.
No. 389,598. Patented Sept. 18, 1888.
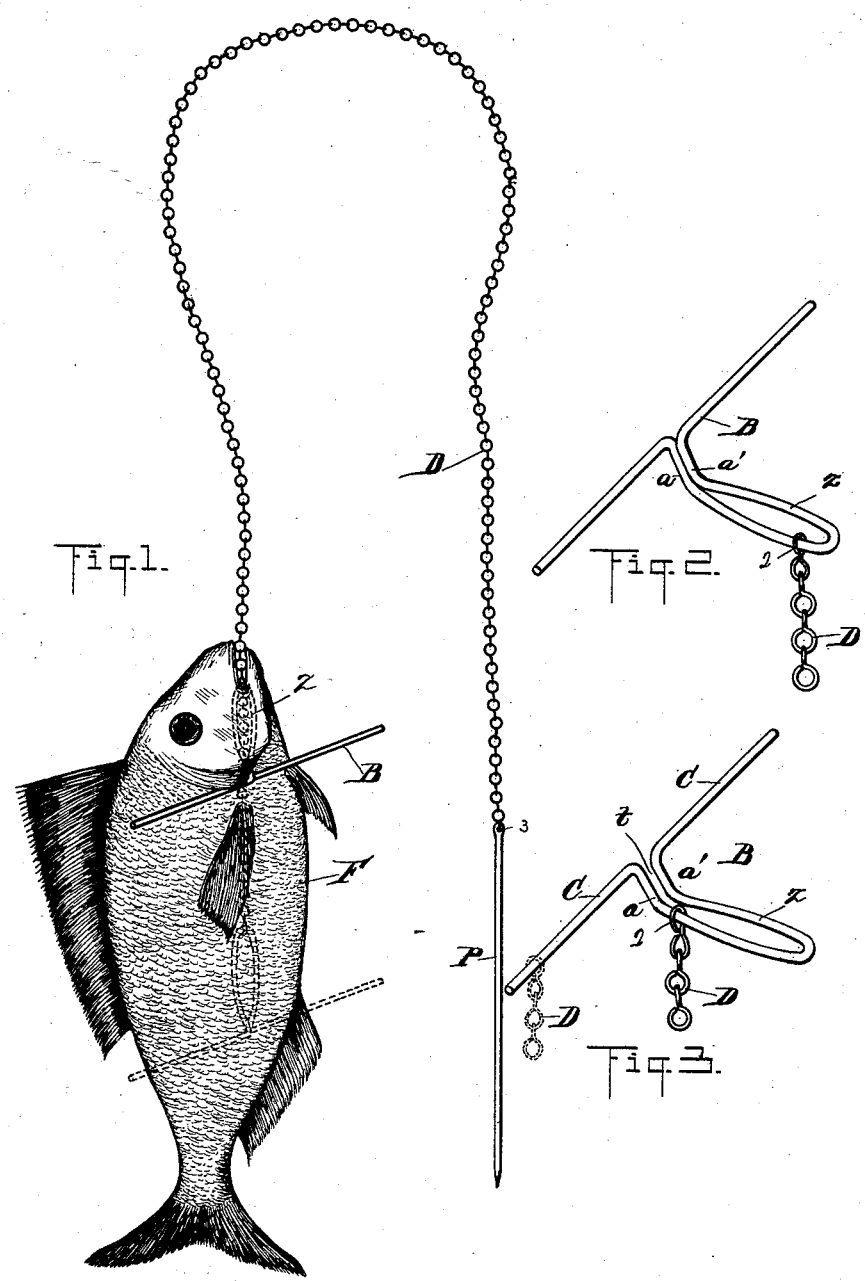
Attest.
Inventor.

UNITED STATES PATENT OFFICE.

FRED A. ROBERTS, OF MILAN, OHIO.

DEVICE FOR STRINGING FISH.

SPECIFICATION forming part of Letters Patent No. 389,598, dated September 18, 1888.

Application filed June 16, 1888. Serial No. 277,388. (No model.)

*To all whom it may concern:*

Be it known that I, FRED A. ROBERTS, a citizen of the United States, residing at Milan, in the county of Erie and State of Ohio, have invented certain new and useful Improvements in Devices for Stringing Fish; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a device for stringing fish; and it consists of the spring-metal guard or supporting-head having a loop which receives the chain, having at its opposite end the stringing needle or pin. Said chain is held within the loop by the pressure of the crossing or meeting faces of the bars forming said loop. The free ends of the guard are bent from each other and at right angles to the loop, the parts being formed from a single piece of wire or metal. The chain may be detached from the supporting-head by forcing the bars (at the point where they meet) from each other, and sliding the chain-link through the opening and along one of the prongs, as will be hereinafter set forth. By this arrangement fish may be removed from the bottom of the device more readily than from the top, as is the common practice. A wire cable having a ring at one end may be used as an equivalent of the chain. The device thus constructed is light, cheap, and durable.

In the accompanying drawings, forming a part of the specification, Figure 1 is a plan view of my device, showing a fish strung thereon, showing, also, by dotted lines the guard dropped or lowered, so as to enable detaching the chain. Fig. 2 is an enlarged view of the guard or supporting head having the chain attached and loop closed. Fig. 3 is a view of same, showing the bars of the loop separated, so as to move the chain therefrom.

In the drawings, B represents the guard or supporting-head, which consists of the looped portion Z, which at $a\ a'$ is so shaped as to press or meet each other. At the point where the parts meet the prongs $c\ c$ are formed by bending the free ends of the yoke or guard outward and from each other.

D represents the coupling cord or chain on which the fish is to be strung. The link 2, at one end of the chain, is passed over one of the prongs $c$ to the point where the wires meet each other. Then by pressing the prongs $c\ c$ from each other the opening $t$ is formed, allowing the chain-link to pass into the loop Z. (See positions of Figs. 2 and 3.)

P represents a metallic needle having a hole, 3, at one end, which receives a link of the chain.

In the drawings, F represents a fish attached to my device, all of which is accomplished by passing the needle up under the gills of the fish and out through the mouth. The chain then being drawn upward forces the loop Z into the mouth of the fish, the prongs $c\ c$ engaging with the gills of the fish holding it in position.

To remove the fish from the device, the guard B is drawn down, as shown by dotted lines of Fig. 1, the loop Z is opened at $a\ a'$, as before stated, and the chain is removed from the guard.

Having thus fully set forth my invention, what I claim as new, and desire to secure by Letters Patent, is—

1. In a device for the purposes specified, the combination of the chain having a needle at one end, and the guard constructed as set forth, and having a detachable connection with said chain, substantially as and for the purposes specified.

2. In combination with the chain or its equivalent, the needle attached to one end thereof and the guard attached to the opposite end, said guard consisting of spring-metal and having the loop Z, the meeting points $a$ $a'$, and the prongs $c\ c$, as and for the purposes specified.

In testimony whereof I affix my signature in presence of two witnesses.

FRED A. ROBERTS.

Witnesses:
A. E. DOANE,
H. L. SEAMAN.